US007596090B2

(12) United States Patent
Black (10) Patent No.: US 7,596,090 B2
(45) Date of Patent: Sep. 29, 2009

(54) CAPACITY-EFFICIENT FLOW CONTROL MECHANISM

(75) Inventor: Peter J. Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 951 days.

(21) Appl. No.: 09/970,586

(22) Filed: Oct. 4, 2001

(65) Prior Publication Data

US 2003/0067897 A1    Apr. 10, 2003

(51) Int. Cl.
*H04L 12/26* (2006.01)
(52) U.S. Cl. .................. 370/234; 370/235; 370/252
(58) Field of Classification Search ............. 370/229, 370/230, 230.1, 231–235, 252, 335–337, 370/342, 347, 441, 442
See application file for complete search history.

(56) References Cited

U.S. PATENT DOCUMENTS

| 4,901,307 | A |   | 2/1990 | Gilhousen et al. |   |
|---|---|---|---|---|---|
| 5,103,459 | A |   | 4/1992 | Gilhousen et al. |   |
| 6,141,565 | A | * | 10/2000 | Feuerstein et al. | 455/560 |
| 6,335,922 | B1 |   | 1/2002 | Tiedemann |   |
| 6,456,850 | B1 | * | 9/2002 | Kim et al. | 455/453 |
| 6,519,461 | B1 | * | 2/2003 | Andersson et al. | 455/453 |
| 6,574,211 | B2 |   | 6/2003 | Padovani et al. |   |
| 6,650,643 | B1 | * | 11/2003 | Dobson | 370/229 |
| 6,748,220 | B1 | * | 6/2004 | Chow et al. | 455/450 |
| 8,850,506 |   |   | 2/2005 | Holtzman |   |
| 2003/0022629 | A1 | * | 1/2003 | Miyoshi et al. | 455/67.3 |

OTHER PUBLICATIONS

TIA/EIA/IS-95-B, "Mobile Station-Based Station Compatibility Standard for Dual-Mode Wideband Spread Spectrum Cellular System" (Mar. 1999).
TIA/EIA/IS-98 Recommended Minimum Standard for Dual-Mode Wideband Spread Spectrum Cellular Mobile Station, (Dec. 1994).
ETSI TS 25.211, V7.0.0, "Universal Mobile Telecommunications System (UMTS): Physical Channels and Mapping of Transport Channels onto physical channels (FDD)" 3GPP TS 25.211 V 7.0.0 Rel. 7 (Mar. 2006).
3GTS25.212 V3.2.0 "Technical Specification Group Radio Access Network: Multiplexing and channel coding (FDD)" Release 1999 (Mar. 2000).
ETSI TS 125 213 V7.0.0 "Universal Mobile Telecommunications System (UTS); Spreading and modulation (FDD)", 3GPP TS 25.213 V 7.0.0 Rel. 7, (Mar. 2006).
3GTS 25.214 V3.2.0 "Technical Specification Group Radio Access Network; Physical Layer Procedures (FDD)" Rel. 1999 (Mar. 2000).
3GPP2 C.S0001: 3RD Generation Partnership Project 2 "3GPP2", "Physical Layer Standard for cdma2000 Spread Spectrum Systems", pp. 1-409, Release 0, Version 3.0 (2001.06).

* cited by examiner

*Primary Examiner*—Wing F Chan
*Assistant Examiner*—Duc T Duong
(74) *Attorney, Agent, or Firm*—Kent D. Baker; Charles E. Eggers (57) ABSTRACT

Techniques to control data transmissions to efficiently utilize the available air-link resources. In accordance with a method for controlling a data transmission between a transmission source (e.g., a base station) and a receiving device (e.g., a remote terminal), a current transmission at a current data rate for a current transmission interval is received. An average throughput for the data transmission is then updated to reflect the current transmission at the current data rate. The updated average throughput is compared against a threshold throughput (which has been previously characterized) supported by the receiving device. If the average throughput exceeds the threshold throughput, the transmission source is signaled to (temporarily) stop the data transmission. Subsequently, after the average throughput has dropped below the threshold throughput, the transmission source can be signaled to resume the data transmission.

66 Claims, 8 Drawing Sheets

CAPACITY-EFFICIENT FLOW CONTROL MECHANISM

BACKGROUND OF THE INVENTION

I. Field of the Invention

The present invention relates to data communication. More particularly, the present invention relates to novel and improved techniques to control transmissions in a variable rate communication system.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." Another specific CDMA system is disclosed in U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003 (the HDR system). These patents are assigned to the assignee of the present invention and incorporated herein by reference.

CDMA systems are typically designed to conform to one or more standards. Such standards include the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and the "TR-45.5 Physical Layer Standard for cdma2000 Spread Spectrum Systems" (the cdma2000 standard). The HDR system can be designed to conform to the specifications defined in a document entitled "HDR Air Interface (HAI) Specification" (the HAI specification), which has been provided to the 3GPP2/TSG-C standard body and is the basis for development of a final standard. These adopted and proposed standards are incorporated herein by reference.

Newer generation CDMA systems are typically capable of supporting a number of data rates that typically include a high maximum data rate. For example, the HDR system can be operated to transmit data at rates ranging from 38.4 Kbps up to 2467.6 Kbps. This wide range of data rates is especially effective for data communication, which is typically characterized by long periods of silence punctuated by large bursts of traffic.

In some CDMA systems such as the HDR system, a large portion of the available system resources can be used to transmit to a single remote terminal for a particular time period to support a high peak data rate. However, possibly for costs and other considerations, many remote terminals may be designed to support a particular average data rate, which is typically only a fraction of the peak data rate. For these remote terminals, sustained transmission at a data rate higher than the supported average data rate may result in the transmitted packets being dropped or received in error. When this occurs, valuable system resources are wasted by transmitting to remote terminals not capable of processing the transmission.

As can be seen, techniques to control transmissions in a variable data rate communication system based on the capability of the remote terminals and such that the available system resources are efficiently utilized are highly desirable.

SUMMARY OF THE INVENTION

The invention provides techniques to control data transmissions to efficiently utilize the available air-link resources. In accordance with an aspect of the invention, an average data rate (i.e., average throughput) for a data transmission is monitored and data is transmitted if the average throughput is less than or equal to a maximum supported average data rate (i.e., threshold throughput). This design relieves the remote terminal from having to support a sustained transmission at a high data rate, which is typically not needed in light of the bursty nature of data transmission. This design further allows for efficient utilization of the valuable air-link resources since data is not transmitted to a remote terminal incapable of processing the transmission.

An embodiment of the invention provides a method for controlling a data transmission between a transmission source (e.g., a base station) and a receiving device (e.g., a remote terminal). In accordance with the method (which is typically performed at the remote terminal), a current transmission at a current data rate for a current transmission interval is received. An average throughput for the data transmission is then updated to reflect the current transmission at the current data rate. The average throughput can be obtained by averaging a value indicative of a throughput (e.g., the current data rate) for the current transmission with other values indicative of throughput for one or more prior transmissions in one or more prior transmission intervals. The average throughput is then compared against a threshold throughput (which has been previously characterized) supported by the receiving device. If the detected average throughput exceeds the threshold throughput, the transmission source is signaled to (temporarily) stop the data transmission. Subsequently, after the average throughput has dropped below the threshold throughput, the transmission source can be signaled to resume the data transmission.

The invention further provides other methods, remote terminals, base stations, and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
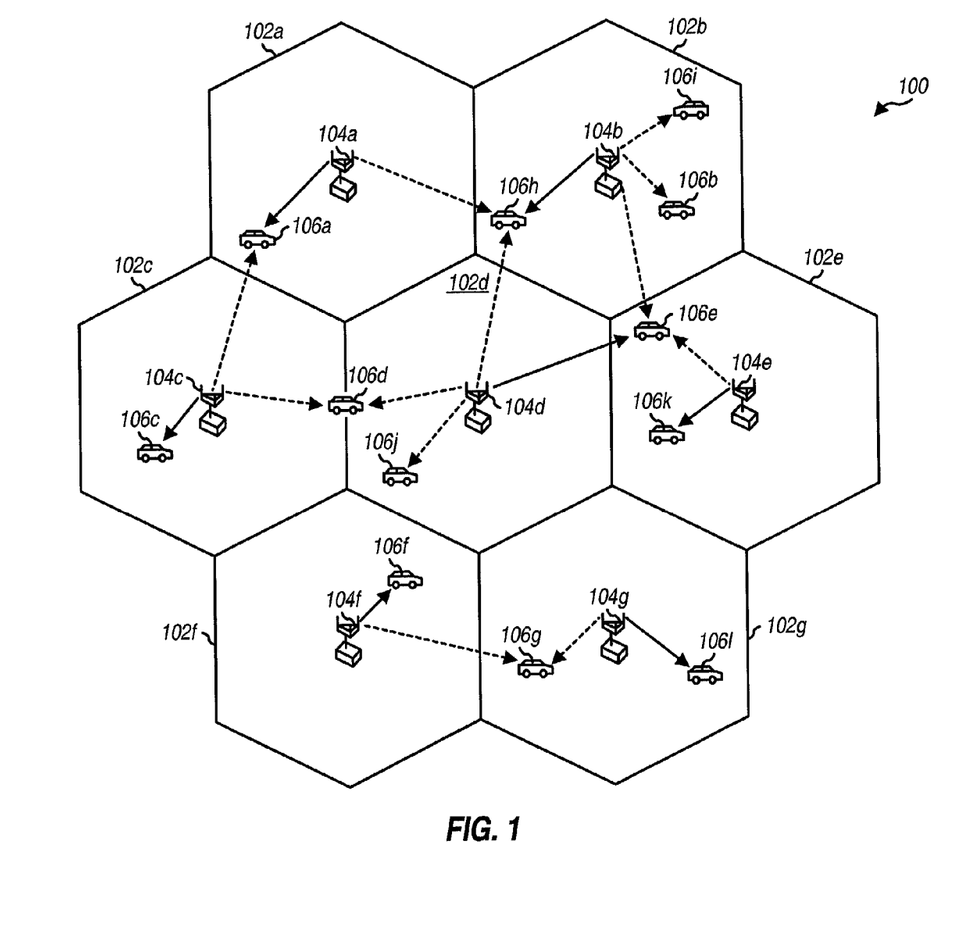
FIG. 1 is a diagram of a communication system that supports a number of users and can implement various aspects of the invention.

FIG. 1 is a diagram of a communication system 100 that supports a number of users and can implement various aspects of the invention. System 100 may be designed to conform to one or more CDMA standards (e.g., the IS-95, W-CDMA, cdma2000, and other standards), one or more CDMA designs (e.g., the HDR design), or a combination thereof. System 100 provides communication for a number of cells 102a through 102g, with each cell 102 being serviced by a corresponding base station 104. Various remote terminals 106 are dispersed throughout the system.

Each remote terminal 106 may communicate with zero, one, or more base stations 104 on the downlink and uplink at any given moment, depending on the particular design of the system and whether the remote terminal is receiving a data transmission. The forward link (downlink) refers to transmission from the base station to the remote terminal, and the reverse link (uplink) refers to transmission from the remote terminal to the base station. In FIG. 1, a solid line with an arrow indicates a data transmission from the base station to the remote terminal, and a broken line with an arrow indicates a pilot and/or signaling transmission. The uplink communication is not shown in FIG. 1 for simplicity.

As shown in FIG. 1, base station 104a transmits data to remote terminal 106a on the downlink; base station 104b transmits data to remote terminal 106h; base station 104c transmits data to remote terminal 106c, and so on. In the example shown in FIG. 1, remote terminal 106h receives a data transmission from base station 104b and pilots from base stations 104a and 104d.

Figure 2:
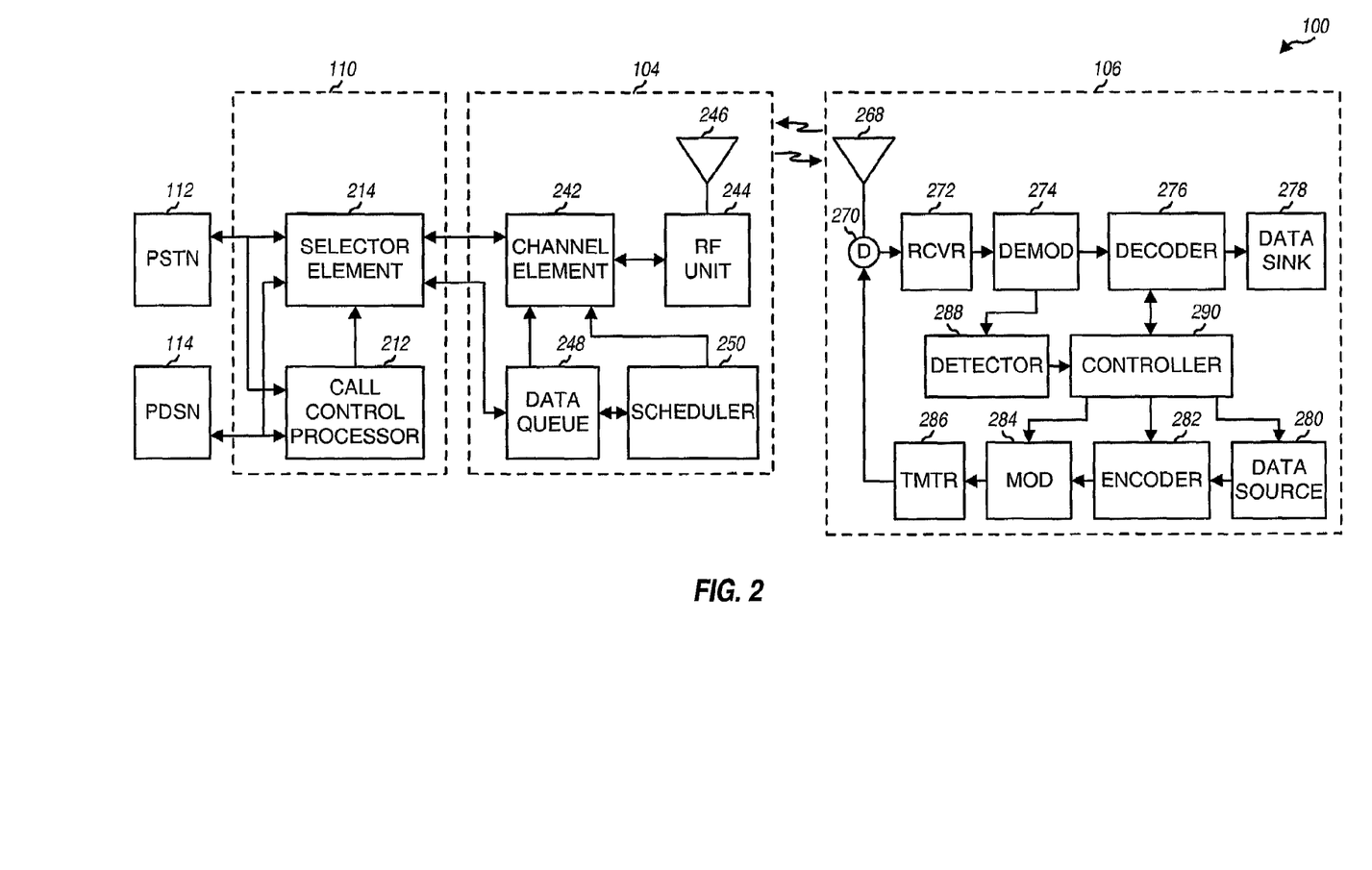
FIG. 2 is a simple block diagram of a specific design of some of the elements in the communication system shown in FIG. 1.

FIG. 2 is a simple block diagram of a specific design of some of the elements in communication system 100, which may be operated to implement various aspects of the invention. System 100 includes a base station controller (BSC) 110 that communicates with a number of base stations 104 (only base station is shown in FIG. 2 for simplicity). BSC 110 further interfaces with a public switch telephone network (PSTN) 112 and a packet data serving node (PDSN) 114. BSC 110 coordinates the communication between the remote terminals in the system and base stations 104, PSTN 112, and PDSN 114.

In the specific design shown in FIG. 2, BSC 110 includes a call control processor 212 and a number of selector elements 214 (only one selector element is shown in FIG. 2 for simplicity). Call control processor 212 controls the processing of a call for each remote terminal (e.g., directs the base station to transmit a channel assignment message to the remote terminal on the forward link). One selector element 214 is assigned to control the communication between each remote terminal and one or more base stations.

In the design shown in FIG. 2, base station 104 includes a number of channel elements 242 (only one channel element is shown in FIG. 2 for simplicity), a data queue 248, and a scheduler 250. One channel element 242 is assigned to process the communication with each remote terminal. Each channel element 242 assigned to a particular remote terminal couples to an associated selector element 214 of BSC 110 also assigned to the same remote terminal. Data queue 248 couples to channel elements 242 and receives and stores data to be transmitted on the forward link to the remote terminals. Scheduler 250 couples to all channel elements 242 and data queue 248, and schedules transmissions for data users.

Each assigned channel element 242 receives scheduling information (e.g., the data rate, transmit power, and transmit time period) from scheduler 250 and further receives data from data queue 248 and/or the associated selector element 214. Each assigned channel element 242 then encodes and modulates data for the remote terminal based on the received scheduling information. The modulated signal is upconverted and conditioned by an RF unit 244 and transmitted via an antenna 246 over the forward link.

At the recipient remote terminal 106, the forward link signal is received by an antenna 268, routed through a duplexer 270, and provided to a receiver unit (RCVR) 272. Receiver unit 272 filters, amplifies, downconverts, and digitizes the received signal. The digitized samples are then demodulated by a demodulator (DEMOD) 274, decoded by a decoder 276, and provided to a data sink 278. The demodulation and decoding are performed in a complementary manner to the modulation and encoding performed at the base station. A controller 290 may direct the processing of the received forward link signal.

Data transmission on the reverse link occurs in a similar manner. Data is provided from a data source 280 within remote terminal 106, and encoded by an encoder 282. Signaling may also be provided by controller 290, combined with the encoded data, and appropriately modulated by a modulator (MOD) 284 to provide a modulated signal. The modulated signal is then upconverted and conditioned by a transmitter unit (TMTR) 286, routed through duplexer 270, and transmitted via antenna 268 over the reverse link.

At base station 104, the reverse link signal is received by antenna 246 and provided to RF unit 244. RF unit 244 filters, amplifies, downconverts, and digitizes the reverse link signal, and further provides the digitized samples to the channel element 242 assigned to the remote terminal. The assigned channel element 242 then demodulates and decodes the samples in a manner complementary to the modulation and encoding performed at the transmitting remote station. The decoded data may be provided to the associated selector element 214, which may forward the data to another base station 104, PSTN 112, or PDSN 114.

The system design, as described above, supports transmission for both data and voice services. The encoding and modulation for the forward and reverse links are defined by the particular CDMA standard or design being implemented (e.g., IS-95A, W-CDMA, cdma2000, or HDR) and are not described in detail herein.

The functions described above can also be achieved by other designs. The location of scheduler 250 is dependent on whether a centralized or distributed scheduling of data transmissions is desired. For example, as shown in FIG. 2, scheduler 250 can be included within each base station to allow the base station to perform its own scheduling, which may reduce the processing delays. Alternatively, scheduler 250 can be included within the BSC and designed to schedule data transmissions for all base stations in the system. This centralized processing may result in a more efficient use of the system resources. Other designs can also be contemplated and are within the scope of the invention.

As shown in FIG. 1, the remote terminals are dispersed throughout the system. Scheduler 250 is tasked with scheduling the data transmissions to the data users within the coverage area such that a set of goals is optimized. These goals may include (1) improved utilization of the forward link capacity by transmitting as much data as can be supported by the available system resources and link conditions, (2) reduced transmission delays, and (3) fair allocation of the forward link capacity to all data users based on a set of priorities. The goals are optimized by balancing a list of factors. Forward link scheduling is described in further detail in U.S. patent application Ser. No. 08/798,951, entitled "METHOD AND APPARATUS FOR FORWARD LINK RATE SCHEDULING," filed Mar. 17, 2000, now U.S. Pat. No. 6,335,922, issued Jan. 1, 2002, and Ser. No. 09/528,235, entitled "FORWARD-LINK SCHEDULING IN A WIRELESS COMMUNICATION SYSTEM," now U.S. Pat. No. 6,850,506, issued Feb. 1, 2005, both assigned to the assignee of the invention and incorporated herein by reference.

To support the burgeoning demands for data service (e.g., the Internet), many newer generation communication systems are capable of transmitting data at variable (and high) data rates. One such system is the HDR system, which is capable of transmitting data at a number of data rates ranging from 38.4 Kbps up to 2467.6 Kbps. The high peak rate (relative to the Kbps rates supported by the first generation IS-95 CDMA system) is supported by allocating a large portion (or all) of the available system resources (i.e., the transmit power) to a single remote terminal for a particular duration of time. A number of data users can be served by selecting the highest priority data user(s), transmitting to the selected data user(s) for a particular duration of time, and selecting another group of data users for transmission.

Data communication is typically bursty in nature and may be characterized by long periods of silence punctuated by large bursts of traffic. The variable data rates are very effective for data communication, and allow the system to transmit data at a high data rate to a particular remote terminal when a data transmission is requested, and if, the link conditions permit. The high data rate can reduce transmission delays and enhance user satisfaction.

In some CDMA systems, such as the HDR system, the remote terminal measures the quality of the forward link signal and sends a message back to the base station to report the measured link conditions. The message may indicate the maximum data rate supported by the link, as measured at the remote terminal. Alternatively, the message may indicate the carrier-to-total-noise (C/I) measurement for the link, again as measured at the remote terminal. The base station can then transmit data to the remote terminal, if at all, at the indicated data rate or at a data rate supported by the measured C/I.

Because of the bursty nature of data communication and further due to costs and other considerations, it may not be practical (or necessary) to design a remote terminal capable of supporting a sustained transmission at a high data rate. Instead, it may be more economical and/or feasible to design the remote terminal to support a particular expected average data rate, which may only be a fraction of the highest data rate supported by the system. The maximum average data rate supported by the remote terminal is also referred to herein as the maximum sustainable throughput, or simply the threshold throughput. For example, if the remote terminal can support four transmissions at a peak data rate of 2.4 Mbps over six transmission intervals, then the threshold throughput can be computed as (4/6)●2.4 Mbps, or 1.6 Mbps.

Transmitting data at a high data rate for a sustained period of time, such that the threshold throughput is exceeded, can result in performance degradation and inefficient utilization of the available system resources. When the remote terminal's threshold throughput is exceeded, the transmitted packets may be dropped or received in error by the remote terminal. This may then require retransmission of the bad packets, which would consume additional valuable system resources. Also, the dropped and/or error packets at the radio link protocol (RLP) layer may cause error in a packet at a higher signaling layer (e.g., the TCP layer). An error packet at the higher signaling layer is typically more catastrophic since a larger amount of data may need to be retransmitted.

In accordance with an aspect of the invention, the average data rate (or average throughput) for a data transmission is monitored and data is transmitted if the average throughput is less than or equal to the maximum supported average data rate (or threshold throughput). This feature relieves the remote terminal from having to support a sustained transmission at a high data rate, which is typically not needed. This feature further allows for efficient utilization of the valuable air-link resources since data is not transmitted to a remote terminal incapable of processing the transmission.

Figure 3:
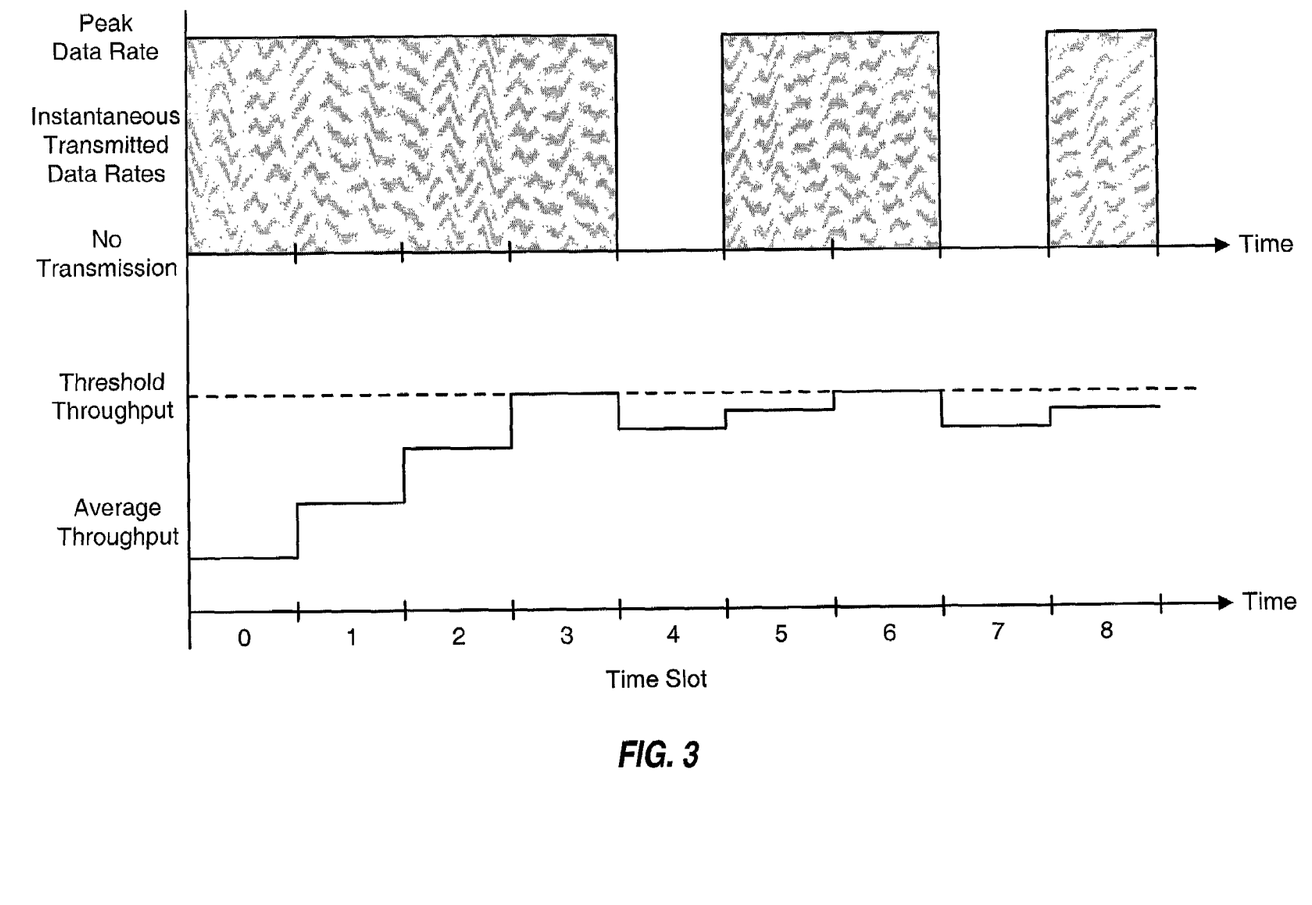
FIG. 3 shows diagrams of the instantaneous data rates and the average data rate for a particular data transmission.

FIG. 3 shows diagrams of the instantaneous data rates and the average data rate for a particular data transmission. The top diagram shows the instantaneous data rates as a function of time, and the lower diagram shows the average data rate (or average throughput) also as a function of time. The remote terminal is designed to support a particular maximum average data rate, which is labeled in the lower diagram as the threshold throughput.

In the example shown in FIG. 3, after a period of silence, data is transmitted to the remote terminal at the highest (peak) data rate at time slot 0, and the average throughput increases correspondingly. Similarly, data is also transmitted at the peak data rate at time slots 1, 2, and 3, and the average throughput reaches the threshold throughput in time slot 3. Transmitting data at time slot 4 would cause the average throughput to exceed the threshold throughput, and may result the remote terminal dropping or incorrectly receiving the packet. Thus, transmission to the remote terminal is temporarily stopped (i.e., stalled) during time slot 4, which causes the average throughput to drop. Data transmission then resumes at the peak data rate for time slots 5 and 6, until the average throughput again reaches the threshold throughput. The data transmission is again stalled at time slot 7, and thereafter resumes at time slot 8 after the average throughput has dropped below the threshold throughput.

Figure 4:
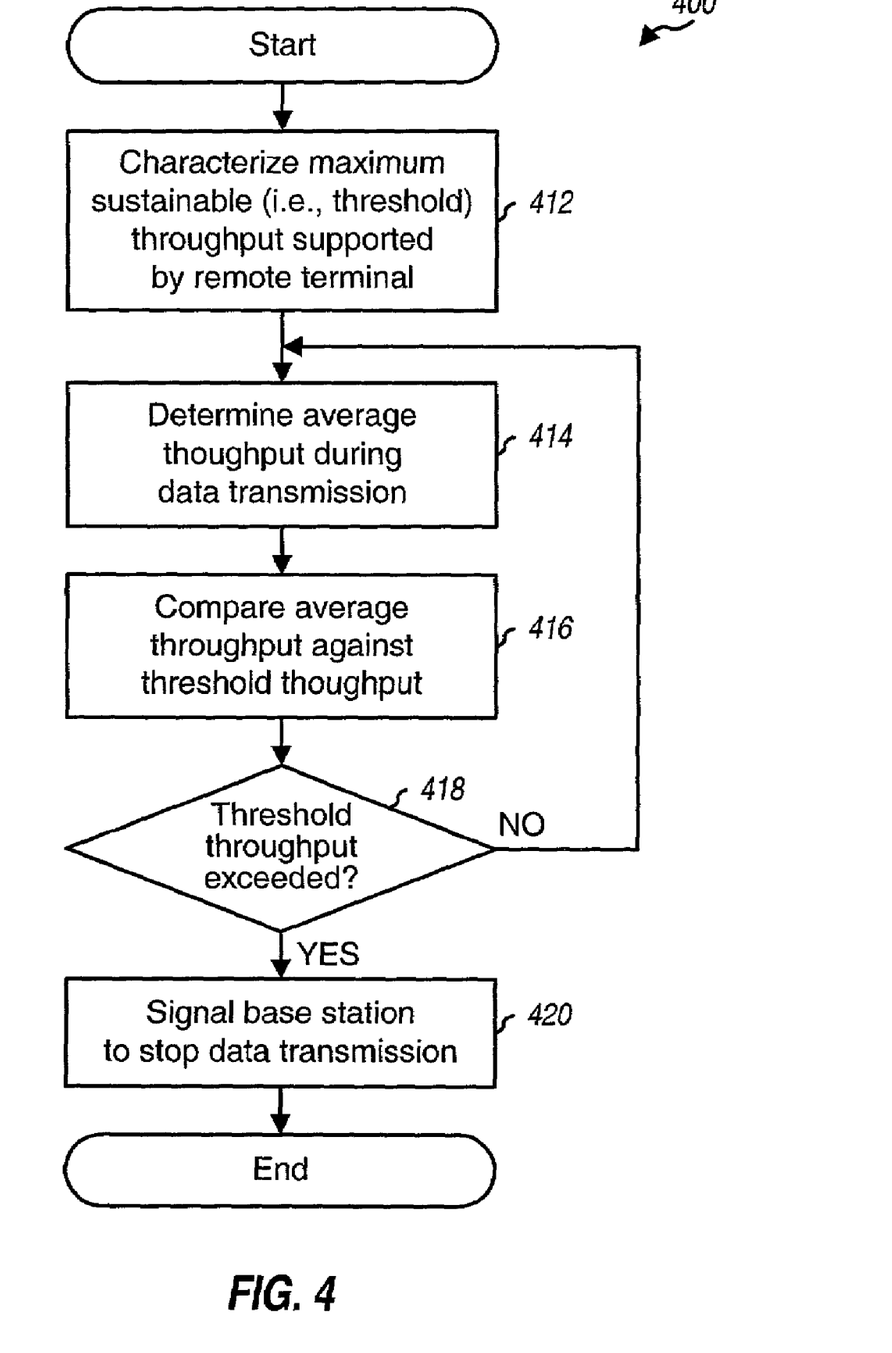
FIG. 4 is a flow diagram of a process to control a data transmission to a particular remote terminal.

FIG. 4 is a flow diagram of a process 400 to control a data transmission to a particular remote terminal in accordance with an embodiment of the invention. Initially, the maximum sustainable (i.e., threshold) throughput supported by the remote terminal is characterized, at step 412. This characterization can be achieved by testing the remote terminal (e.g., during the manufacturing process or during field use), by empirical measurements (e.g., in the lab, during the design phase), by computer simulation (e.g., in the design phase), or by some other means. For example, the average throughput can be monitored during a data transmission and the threshold throughput can be identified when a packet is dropped or received in error. Dropped packets can be detected at the transport layer, by monitoring the data buffer for overflow, or by some other mechanism. In an embodiment, the threshold throughput characterization is performed prior to the first field use of the remote terminal. In another embodiment, the characterization is performed in the field (e.g., as necessary), which may allow the remote terminal to account for any changes in performance over time.

Thereafter, during a particular data transmission, the actual average throughput is determined, at step 414. The average throughput can be determined in a manner described below, and is typically updated for each transmission interval (e.g., each slot in the HDR system). The actual average throughput is then compared against the previously characterized maximum sustainable throughput, at step 416.

At step 418, a determination is made whether the average throughput exceeds the threshold throughput. If the threshold throughput is not exceeded, the process returns to step 414 and the average throughput is again monitored. Otherwise, if the threshold throughput is exceeded, the base station is signaled to (temporarily) stop the data transmission, at step 420. Alternatively, the base station may be signaled to transmit at a lower data rate that does not cause the average throughput to exceed the threshold throughput.

Figure 5A:
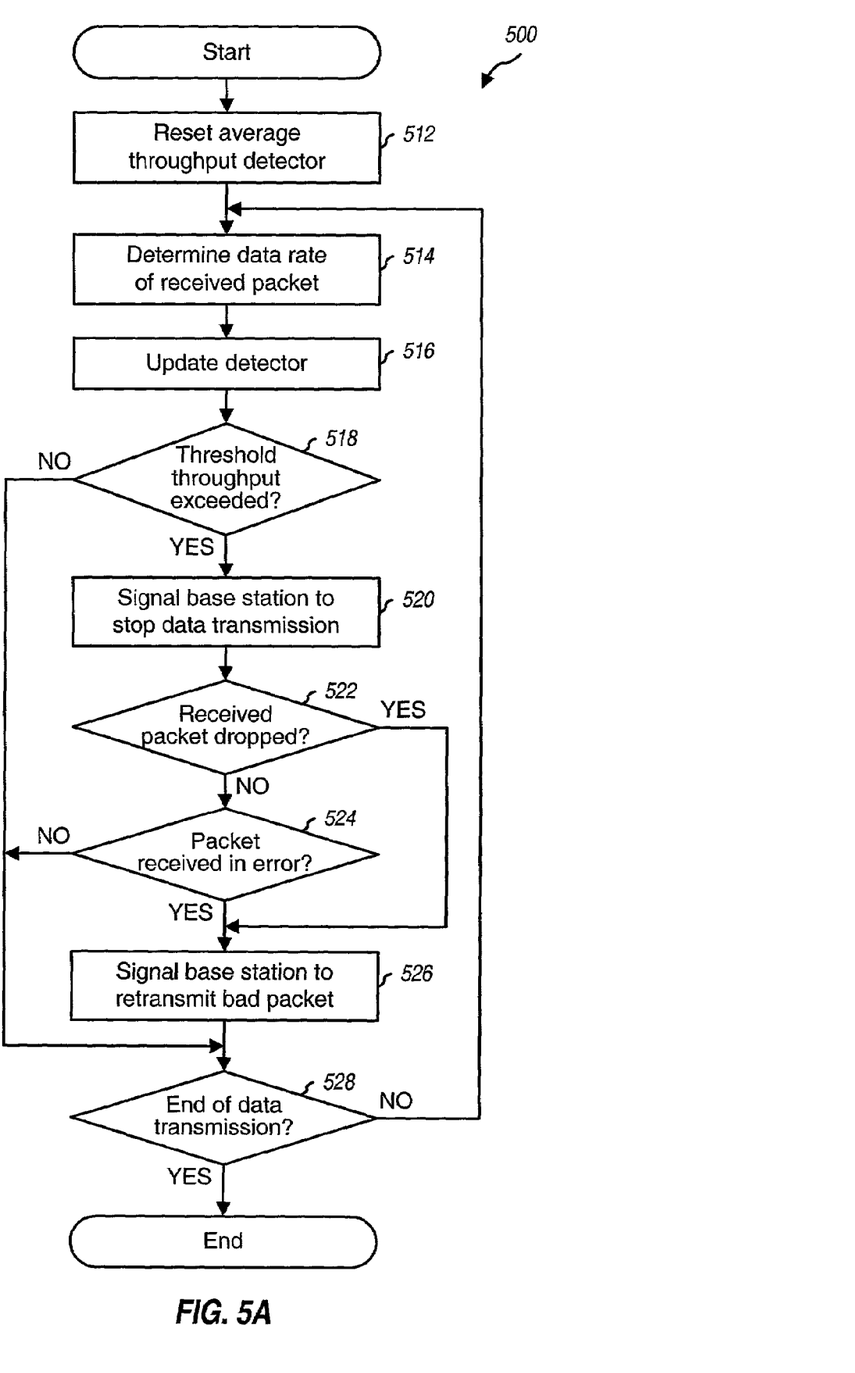
FIG. 5A is a flow diagram of a process performed at a remote terminal to monitor and control a data transmission.

FIG. 5A is a flow diagram of a process 500 performed at a remote terminal to monitor and control a data transmission, in accordance with an embodiment of the invention. The process shown in FIG. 5A is performed for each data transmission received by the remote terminal. Initially, at the start of the data transmission, a detector used to determine the average throughput may be reset, at step 512. The detector is described in further detail below.

For each transmission interval (e.g., each slot in the HDR system, or each frame in the W-CDMA or cdma2000 system), the data rate of the received packet, if any, is determined, at step 514. The detector then updates the average throughput to reflect the data rate of the received packet, at step 516. A determination is then made whether the average throughput exceeds the threshold throughput, at step 518. If the answer is no, the process proceeds to step 528. Otherwise, if the threshold throughput is exceeded, the base station is signaled to (temporarily) stop the data transmission, at step 520. (Alternatively, as noted above, the base station can be signaled to transmit at a reduced data rate such that the threshold throughput will not be exceeded.)

A determination is then made whether the received packet has been dropped, at step 522, or decoded in error, at step 524. If the received packet has not been dropped or decoded in error, the process 500 proceeds to step 528. Otherwise, if the received packet has been dropped or decoded in error, the base station is signaled to retransmit the bad packet, at step 526.

At step 528, a determination is made whether the end of the data transmission has been reached. If more packets are expected to be received for the data transmission, the process returns to step 514 and waits for the next transmission interval. Otherwise, the process terminates.

Figure 5B:
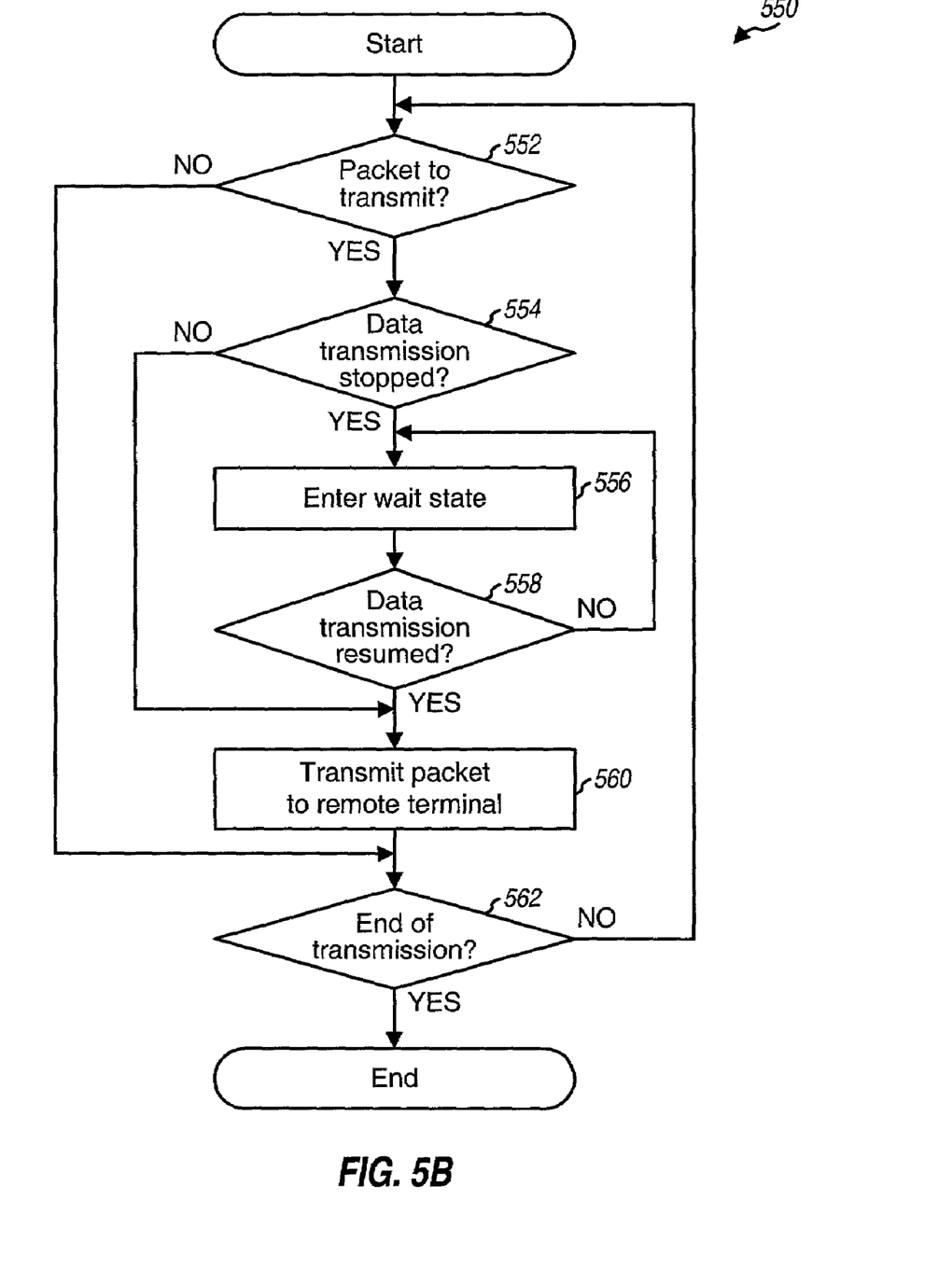
FIG. 5B is a flow diagram of a process performed at a base station to schedule data transmission to a particular remote terminal such that the threshold throughput is not exceeded.

FIG. 5B is a flow diagram of a process 550 performed at a base station to schedule data transmission to a particular remote terminal such that the threshold throughput is not exceeded, in accordance with an embodiment of the invention. The process shown in FIG. 5B is performed for each data transmission to the remote terminal.

As noted above, a data transmission to a remote terminal is typically scheduled, and a packet may or may not be transmitted to the remote terminal in any given transmission interval. The scheduling of data transmission is dependent on a number of factors such as, for example, the priority of the data user, the amount of data to transmit, the link conditions, and so on. The process shown in FIG. 5B is performed for a remote terminal that has been scheduled for a data transmission.

For each transmission interval, a determination is made whether there is a packet to transmit to the remote terminal, at step 552. If the answer is no, the process 550 proceeds to step 562. Otherwise, if there is a packet to transmit (e.g., as determined by the scheduler), a determination is made whether the data transmission to this remote terminal has been (temporarily) stopped, at step 554. The data transmission may be stopped upon receipt of a signal from the remote terminal requesting no data transmission (e.g., if the remote terminal's threshold throughput is exceeded). If the data transmission has not been stopped, the process 550 proceeds to step 560. Otherwise, if the data transmission has been stopped, the process enters a wait state, at step 556.

At each subsequent transmission interval, a determination can be made whether the data transmission has been resumed, at step 558. The data transmission may be resumed upon receipt of a signal from the remote terminal requesting a data transmission (e.g., if it is determined that the remote terminal's threshold throughput will not be exceeded). If the data transmission has not been resumed, the process 550 returns to step 556 and continues to wait. Otherwise, if the data transmission has been resumed, the process proceeds to step 560.

At step 560, the packet is transmitted to the remote terminal. A determination is then made whether the end of the data transmission has been reached, at step 562. If more packets are expected to be transmitted to the remote terminal, the process returns to step 552 and the next packet is processed. Otherwise, the process terminates.

The determination of the average throughput and the processing and control of a data transmission can be implemented in various manners. The specific implementation may be dependent on the particular CDMA standard or design being supported. For a better understanding of the invention, a specific implementation is now described.

Figure 6:
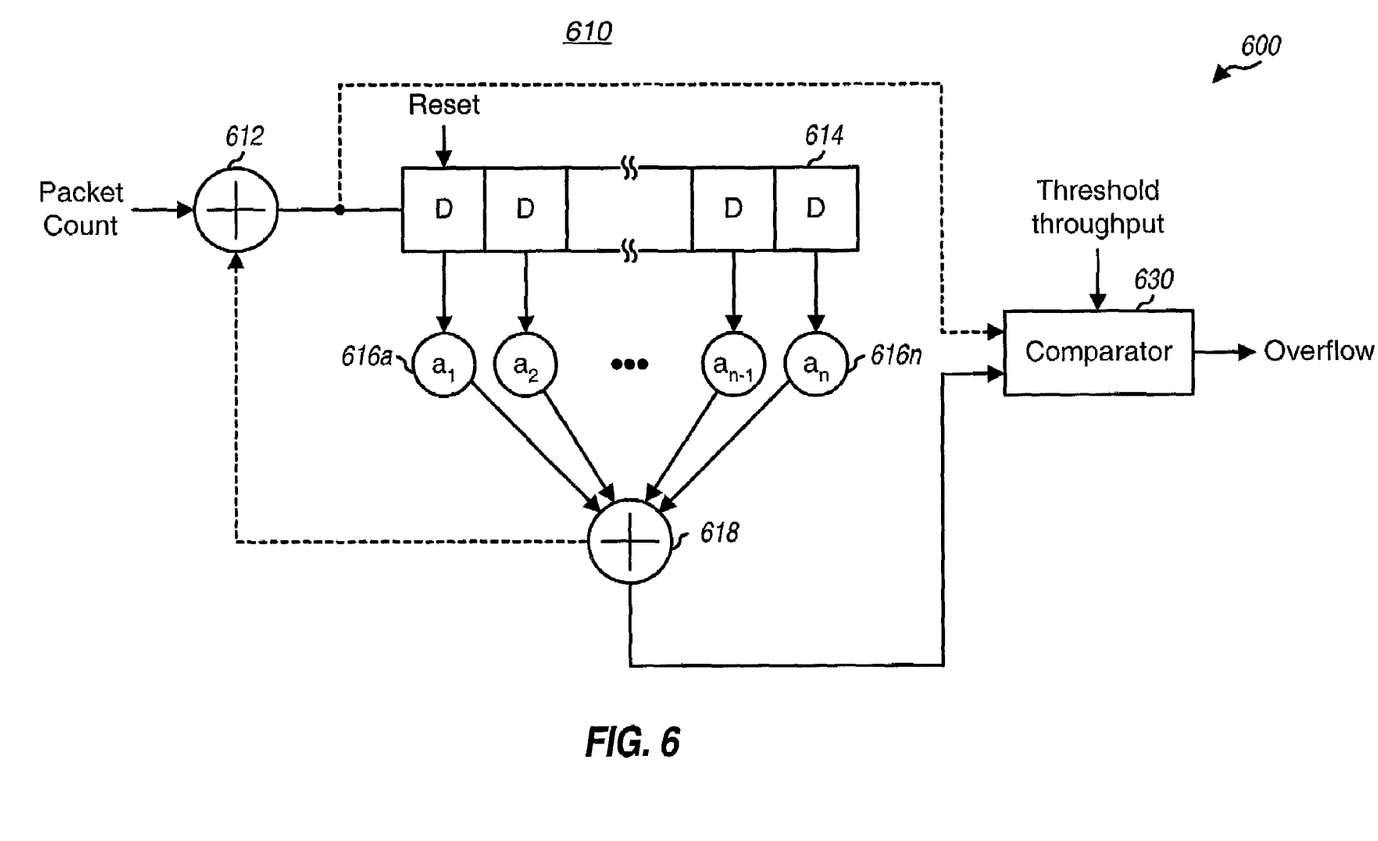
FIG. 6 is a diagram of an embodiment of a detector that can be used to determine the average throughput of a data transmission and to signal when the threshold throughput is exceeded.

FIG. 6 is a diagram of an embodiment of a detector 600 that can be used to determine the average throughput of a data transmission and to signal when the threshold throughput is exceeded. Detector 600 includes a filter 610 coupled to a comparator 630.

Filter 610 receives a value indicative of the data rate for each transmission interval (e.g., a packet count, as shown in FIG. 6). For some variable data rate systems (e.g., the HDR system), each packet covers a particular (fixed) time period. Thus, the number of bits transmitted in each packet is variable and determined by the data rate used for the packet. For these systems, a bit count (instead of the packet count) is more indicative of the data rate used for the transmission interval and is provided to filter 610. Filter 610 then computes the average throughput for the received count value based on a particular averaging scheme.

In the embodiment shown in FIG. 6, filter 610 can be implemented as either a finite impulse response (FIR) filter or an infinite impulse response (IIR) filter.

For the IIR implementation, the (bit or packet) count value is provided to a summer 612 that also receives the output from a summer 618. Summer 612 sums the two received values and provides the result to a set of delay elements (D) 614. Each delay element provides one transmission interval of delay (e.g., one time slot for the HDR system). The outputs from delay elements 614 are provided to respective scaling elements 616. Each scaling element 616 scales the received value with a respective coefficient as and provides the scaled value to summer 618. Summer 618 sums the scaled values from all scaling elements 616. For the IIR implementation, the output from summer 612 comprises the average throughput from the filter (shown as a dashed line) and is provided to comparator 630.

For the FIR implementation, summer 612 is not needed and the (bit or packet) count value is provided directly to the set of delay elements 614. Also, for the FIR implementation, the output from summer 618 comprises the average throughput from the filter and is provided to comparator 630.

The particular weighting scheme to be used to determine the average throughput is dictated by the coefficients $a_i$ for scaling elements 616. The coefficients can be selected to (1) weigh the received count values uniformly over the average time period (i.e., for linear averaging), (2) weigh more recent count values more heavily (i.e., for exponential averaging), or weigh the count values based on some other weighting scheme. A sliding window (linear) averaging can provide an average throughput that more closely match the data buffer used at the remote terminal, and may also be simpler to implement.

The time period over which the averaging is performed can be selected based on various factors such as, for example, the size of the data buffer at the remote terminal, the decoder speed, and so on. The averaging time period is limited by the number of delay elements 614.

Comparator 630 receives the average throughput from filter 610 and the threshold throughput, compares the average and threshold throughputs, and provides an OVERFLOW signal in response to the comparison. In an embodiment, the OVERFLOW signal is logic high if the threshold throughput is exceeded, and logic low otherwise.

Detector 600 can be implemented in hardware or software, or a combination thereof. Unlike the physical layer which typically needs to operate at the peak burst rate, detector 600 updates the average throughput at a lower rate (e.g., the slot rate) and does not need to be designed to operate at a high rate. Detector 600 can be implemented as part of a modem firmware (e.g., DSP code) designed to execute on a processor (e.g., controller 290 in FIG. 2).

The signaling between the remote terminal and the base station can also be achieved in various manners, and is also dependent on the particular CDMA system or standard being implemented. For a better understanding of the invention, the signaling is now specifically described for the HDR system.

The HDR system defines a Data Rate Control (DRC) channel on the reverse link that is used by the remote terminal to send messages specifically to a particular base station from which a data transmission is desired. The messages also indicate the data rate supported by the communications link to the selected base station. The selected base station and supported data rate are sent by the remote terminal for each transmission interval during a data transmission and are used by the selected base station to schedule and transmit data. Each transmission interval in the HDR system corresponds to a 1.667 msec slot.

Figure 7:
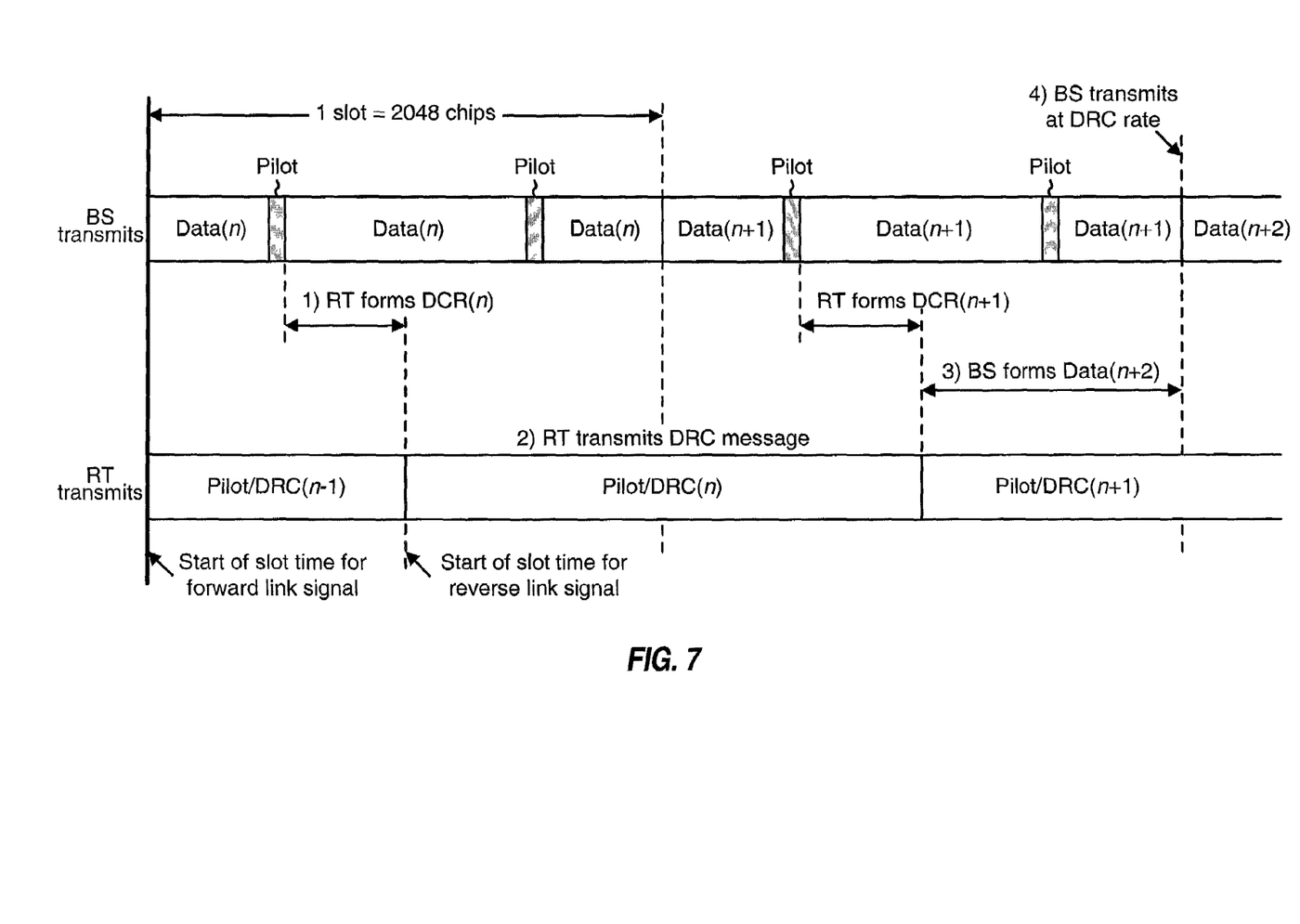
FIG. 7 is a diagram of the processing by the remote terminal and the base station for DRC messages in the HDR system, which can be used to signal the base station to stop and/or resume a data transmission.

FIG. 7 is a diagram of the processing by the remote terminal and the base station for DRC messages in the HDR system. The DRC messages can be used to signal the base station to stop and/or resume a data transmission. At each slot n, the remote terminal (a) measures the quality of the forward link signal (e.g., based on the pilot reference received during the slot) from each base station in the active set, (b) selects the base station having the best received signal quality, (c) determines the data rate supported by the measured signal quality, and (4) forms a DRC message that indicates the identity of the selected base station and the supported data rate. The DRC message is then transmitted to the selected base station. Each base station receives the DRC messages on the reverse link from this and other remote terminals during the next slot n+1 and schedules data transmission for the following slot n+2. If the remote terminal is scheduled for data transmission by the selected base station, data is transmitted at the data rate identified by the DRC message in slot n+2.

Table 1 lists the DRC values and the corresponding data rates for the HDR system. As shown in Table 1, the HDR system defines a NULL rate, which is used if the data rate supported by the transmission link is less than the lowest supported data rate.

TABLE 1

| DRC value | Rate (Kbps) | DRC value | Rate (Kbps) |
| --- | --- | --- | --- |
| 0 | NULL rate | 8 | 921.6 |
| 1 | 38.4 | 9 | 1228.8 |
| 2 | 76.8 | 10 | 1843.2 |
| 3 | 102.4 | 11 | 2457.6 |
| 4 | 153.6 (short) | 12 | NC |
| 5 | 204.8 | 13 | 153.6 (long) |
| 6 | 307.2 (short) | 14 | 307.2 (long) |
| 7 | 614.4 | 15 | NC |

In accordance with the HDR system, the DRC value is block encoded within the remote terminal and further covered with a Walsh cover corresponding to the selected base station. Each base station in the active set of the remote terminal is assigned to one of eight possible (3-bit, 8-chip) Walsh sequences. One Walsh sequence is designated as a NULL cover, which is used to cover the DRC value if the remote terminal does not desire to receive a data transmission from any base station. The covering allows the remote terminal to direct the DRC message specifically to the base station having the best signal quality, and for the selected base station to identify and receive the DRC message designated for it.

For the HDR system, the signaling to (temporarily) stop the data transmission from the selected base station if the threshold throughput is exceeded can be achieved by either sending the NULL rate to the selected base station or covering the DRC value (which has been computed in the normal manner) with the NULL cover.

In the HDR system, the DRC value transmitted by the remote terminal is also used for power control by the selected base station. Thus, although transmitting the NULL rate has the desired effect to stop the data transmission, the transmit power may also be erroneously adjusted by the power control loop based on the NULL rate. This erroneous adjustment of the transmit power may not (noticeably) degrade the performance of the system if the data transmission is stopped for only a small number of slots using the NULL rate.

As defined by the HDR system, the NULL cover can be used to indicate that the remote terminal does not desire any data transmission from the system. Covering the DRC value with the NULL cover has the desired effect to stop the data transmission, but also does not result in an erroneous adjustment of the transmit power. Also, by using the NULL cover, the scheduler can be designed and operated to maintain the remote terminal's priority during the time the data transmission was temporarily stopped such that the same base station can serve the remote terminal when it desires to resume the data transmission. Moreover, no change in handoff is performed when the NULL cover is used.

As noted above and shown in FIG. 7, a signaling delay exists between the transmission of the DRC message by the remote terminal and the corresponding data transmission by the base station. During slot n (based on the time reference of the base station), the remote terminal processes the transmission for the previous slot n−1 and updates the average throughput. If the threshold throughput is exceeded, the remote terminal sends an appropriate DRC message starting in slot n to request the base station to stop the data transmission. This DRC message is received and processed by the base station in the next slot n+1. If requested, the data transmission is stopped for the following slot n+2. As can be seen, a two-slot delay exists between the transmission in slot n−1 that causes the average throughput to exceed the threshold throughput and the stoppage of the data transmission in slot n+2. Because of the signaling delay, the base station may still be transmitting (e.g., at the peak data rate) during slots n and n+1.

In an embodiment, the threshold throughput is decreased to account for the signaling delay. For the specific design shown in FIG. 7, the threshold throughput can be reduced by an amount that assumes a worse case scenario in which transmissions are received at the peak data rate for up to two slots after the remote terminal sends a request to stop the data transmission. The signaling to request the selected base station to resume the data transmission can also be achieved in a manner to account for the signaling delay.

Various aspects, embodiments, and elements of the invention can be implement in hardware or software, or a combination thereof. The processes shown in FIGS. 4, 5A, and 5B, the elements within the base station and remote terminal (e.g., detector 600), and other elements and processes can be implemented using one or more application specific integrated circuits (ASICs), digital signal processors (DSPs), microcontrollers, microprocessors, other electronic circuits designed to perform the functions described herein, or a combination thereof. Also, some of the processes, functions (e.g., averaging and detecting), and elements (e.g., detector 600) described herein can be implemented with a general-purpose processor or a specially designed processor (e.g., controller 290) operated to execute instruction codes designed to achieve the functions described herein.

The invention can be advantageously used for variable rate modems capable of supporting a particular peak-to-average rate, and is especially advantageous for a high peak-to-average rate. The variable data rates allow the system to transmit to the remote terminals based on the (actual) operating conditions and other factors, and the high peak rate can be shared among the remote terminals to reduce transmission delays. The remote terminals may only need to support a particular expected average throughput. In this case, it may be costly if the higher layers (e.g., the decoder) are required to support the high peak rate for a sustained period of time. Also, such capability would be excessive if it is only used for a portion of the time.

For clarity, various aspects and implementations of the invention have been specifically described for the HDR system. However, the invention can also be applied to other CDMA systems such as those that conform to the W-CDMA, cdma2000, and other standards. The invention can also be applied to various types of terminal including, for example, handsets, modems, smart phones, and others.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for controlling a data transmission between a transmission source and a receiving device, the method comprising:
   receiving a current transmission at a current data rate for a current transmission interval;
   detecting an average throughput for the data transmission and reflective of the current transmission;
   comparing the detected average throughput against a threshold throughput, wherein the threshold throughput is based on a maximum supported average data rate; and
   signaling the transmission source to stop the data transmission if the detected average throughput exceeds the threshold throughput.

2. The method of claim 1, further comprising:
   signaling the transmission source to resume the data transmission if the threshold throughput is not exceeded.

3. The method of claim 1, further comprising
   characterizing the performance of the receiving device prior to first field use of the receiving device.

4. The method of claim 1, further comprising
   characterizing the performance of the receiving device dynamically during field use.

5. The method of claim 1, wherein the data transmission is transmitted in time division multiplexed (TDM) transmission intervals.

6. The method of claim 1, wherein the wireless communication system is an HDR CDMA system.

7. The method of claim 1, wherein the wireless communication system is a CDMA system that conforms to W-CDMA standard or cdma2000 standard.

8. The method of claim 1, wherein the threshold throughput is set lower than the maximum supported average data rate to account for signaling delay.

9. The method of claim 1, further comprising:
   signaling the transmission source to transmit at a lower data rate that does not cause the average throughput to exceed the threshold throughput, instead of stopping the data transmission, if the detected average throughput exceeds the threshold throughput.

10. In a wireless communication system, a method for controlling a data transmission between a transmission source and a receiving device, the method comprising:
    receiving a current transmission at a current data rate for a current transmission interval;
    detecting an average throughput for the data transmission and reflective of the current transmission;
    comparing the detected average throughput against a threshold throughput;
    signaling the transmission source to stop the data transmission if the detected average throughput exceeds the threshold throughput; and
    averaging a value indicative of a throughput for the current transmission with values indicative of throughputs for one or more prior transmissions in one or more prior transmission intervals, wherein the averaging is achieved with a sliding window averaging.

11. The method of claim 10, wherein the averaging is further achieved with a particular averaging scheme selected based in part on a design of a data buffer used to store samples for the data transmission.

12. The method of claim 10, further comprising:
    resetting the average throughput to an initial value prior to reception of a first transmission for the data transmission.

13. The method of claim 10, further comprising:
if the data transmission has been stopped and the threshold throughput is not exceeded, signaling the base station to resume the data transmission.

14. In a wireless communication system, a method for controlling a data transmission between a transmission source and a receiving device, the method comprising:
receiving a current transmission at a current data rate for a current transmission interval;
detecting an average throughput for the data transmission and reflective of the current transmission;
comparing the detected average throughput against a threshold throughput; and
signaling the transmission source to stop the data transmission if the detected average throughput exceeds the threshold throughput, wherein the signaling includes sending a message to the transmission source to request the data transmission be stopped, and wherein the message is covered by a null cover that indicates that data transmission is not requested by the receiving device.

15. The method of claim 14, wherein the message requests a transmission at zero data rate.

16. The method of claim 14, wherein the message is sent for each transmission interval in which a transmission is not requested.

17. A terminal operative to receive a data transmission from a transmission source in a wireless communication system, the terminal comprising:
a receiver unit operative to receive and process a modulated signal for the data transmission to provide digitized samples;
a demodulator coupled to the receiver unit and operative to receive and process the digitized samples to provide a value indicative of a current data rate for a current transmission in a current transmission interval;
a detector coupled to the demodulator and operative to
detect an average throughput for the data transmission, wherein the average throughput is reflective of the current data rate for the current transmission,
compare the detected average throughput against a threshold throughput, and
provide a status signal indicative of a result of the comparison between the detected average throughput and the threshold throughput;
a controller coupled to the detector and operative to receive the status signal and generate a message requesting the transmission source to stop the data transmission if the detected average throughput exceeds the threshold throughput; and
a transmitter unit coupled to the controller and operative to receive and transmit the message,
wherein the detector includes:
a filter operative to receive a value indicative of a throughput for the current transmission and provide the average throughput, and
a comparator coupled to the filter and operative to receive and compare the average throughput with the threshold throughput to provide the status signal.

18. The terminal of claim 17, wherein the filter is implemented as a finite impulse response (FIR) filter.

19. The terminal of claim 17, wherein the message conforms to a DRC message defined by an HDR CDMA system.

20. An apparatus adapted for wireless communications, comprising:
a processor configured to:
receive a current transmission at a current data rate for a current transmission interval;
detect an average throughput for a data transmission and reflective of the current transmission;
compare the detected average throughput against a threshold throughput;
signal a transmission source to stop the data transmission if the detected average throughput exceeds the threshold throughput; and
average a value indicative of a throughput for the current transmission with values indicative of throughputs for one or more prior transmissions in one or more prior transmission intervals, wherein the averaging is achieved with a sliding window averaging.

21. An apparatus adapted for wireless communications, comprising:
a processor configured to:
receive a current transmission at a current data rate for a current transmission interval;
detect an average throughput for a data transmission and reflective of the current transmission;
compare the detected average throughput against a threshold throughput; and
signal a transmission source to stop the data transmission if the detected average throughput exceeds the threshold throughput, wherein the signaling includes sending a message to the transmission source to request the data transmission be stopped, and wherein the message is covered by a null cover that indicates that data transmission is not requested by a receiving device.

22. An apparatus adapted for wireless communications, comprising:
a processor configured to:
receive a current transmission at a current data rate for a current transmission interval;
detect an average throughput for a data transmission and reflective of the current transmission;
compare the detected average throughput against a threshold throughput, wherein the threshold throughput is based on a maximum supported average data rate; and
signal a transmission source to stop the data transmission if the detected average throughput exceeds the threshold throughput.

23. An apparatus for controlling a data transmission between a transmission source and a receiving device in a wireless communication system, the apparatus comprising:
means for receiving a current transmission at a current data rate for a current transmission interval;
means for detecting an average throughput for the data transmission and reflective of the current transmission;
means for comparing the detected average throughput against a threshold throughput, wherein the threshold throughput is based on a maximum supported average data rate; and
means for signaling the transmission source to stop the data transmission if the detected average throughput exceeds the threshold throughput.

24. The apparatus of claim 23, further comprising:
means for signaling the transmission source to resume the data transmission if the threshold throughput is not exceeded.

25. The apparatus of claim 23, further comprising:
means for averaging a value indicative of a throughput for the current transmission with values indicative of throughputs for one or more prior transmissions in one or more prior transmission intervals.

26. The apparatus of claim 23, further comprising:
means for covering a message with a null cover to indicate that data transmission is not requested by the receiving device; and
means for sending the message to the transmission source to request the data transmission be stopped.

27. The apparatus of claim 23, further comprising:
means for generating a message requesting a transmission at zero data rate; and
means for sending the message to the transmission source to request the data transmission be stopped.

28. The apparatus of claim 23, further comprising:
means for signaling the transmission source to transmit at a lower data rate that does not cause the average throughput to exceed the threshold throughput, instead of stopping the data transmission, if the detected average throughput exceeds the threshold throughput.

29. An apparatus for receiving a data transmission from a transmission source in a wireless communication system, the apparatus comprising:
a detector operative to receive a value indicative of a current data rate for a current transmission in a current transmission interval, to detect an average throughput for the data transmission and reflective of the current transmission, to compare the detected average throughput against a threshold throughput, wherein the threshold throughput is based on a maximum supported average data rate, and to provide a status signal indicative of a result of the comparison between the detected average throughput and the threshold throughput; and
a controller coupled to the detector and operative to receive the status signal and to signal the transmission source to stop the data transmission if the status signal indicates that the detected average throughput exceeds the threshold throughput.

30. The apparatus of claim 29, wherein the controller is operative
to signal the transmission source to resume the data transmission if the threshold throughput is not exceeded.

31. The apparatus of claim 29, wherein the detector is operative
to average a value indicative of a throughput for the current transmission with values indicative of throughputs for one or more prior transmissions in one or more prior transmission intervals.

32. The apparatus of claim 29, wherein the controller is operative
to cover a message with a null cover to indicate that data transmission is not requested, and
to send the message to the transmission source to request the data transmission be stopped.

33. The apparatus of claim 29, wherein the controller is operative
to generate a message requesting a transmission at zero data rate; and
to send the message to the transmission source to request the data transmission be stopped.

34. The apparatus of claim 29, wherein the controller is operative
to signal the transmission source to transmit at a lower data rate that does not cause the average throughput to exceed the threshold throughput, instead of stopping the data transmission, if the detected average throughput exceeds the threshold throughput.

35. A method for sending a data transmission to a receiving device in a wireless communication system, the method comprising:
receiving data to send to the receiving device;
entering a wait state if the data transmission to the receiving device has been stopped based on signaling sent by the receiving device when a detected average throughput at the receiving device exceeds a threshold throughput, wherein the threshold throughput is based on a maximum supported average data rate for the receiving device; and
sending the data to the receiving device if the data transmission has not been stopped or upon exiting the wait state when the data transmission is resumed.

36. The method of claim 35, wherein the entering the wait state comprises
entering the wait state in response to receiving a message covered with a null cover from the receiving device.

37. The method of claim 35, wherein the entering the wait state comprises
entering the wait state in response to receiving a message requesting a transmission at zero data rate from the receiving device.

38. The method of claim 35, further comprising:
exiting the wait state in response to receiving signaling sent by the receiving device to resume the data transmission when the threshold throughput is not exceeded at the receiving device.

39. The method of claim 35, further comprising:
sending the data at a lower data rate that does not cause the average throughput to exceed the threshold throughput at the receiving device, instead of catering the wait slate, if signaling indicating that the detected average throughput exceeded the threshold throughput is received from the receiving device.

40. An apparatus for sending a data transmission to a receiving device in a wireless communication system, the apparatus comprising:
means for receiving data to send to the receiving device;
means for entering a wait state if the data transmission to the receiving device has been stopped based on signaling sent by the receiving device when a detected average throughput at the receiving device exceeds a threshold throughput, wherein the threshold throughput is based on a maximum supported average data rate for the receiving device; and
means for sending the data to the receiving device if the data transmission has not been stopped or upon exiting the wait state when the data transmission is resumed.

41. The apparatus of claim 40, wherein the means for entering the wait state comprises
means for entering the wait state in response to receiving a message covered with a null cover from the receiving device.

42. The apparatus of claim 40, wherein the means for entering the wait state comprises
means for entering the wait state in response to receiving a message requesting a transmission at zero data rate from the receiving device.

43. The apparatus of claim 40, further comprising:
means for exiting the wait state in response to receiving signaling sent by the receiving device to resume the data transmission when the threshold throughput is not exceeded at the receiving device.

44. The apparatus of claim 40, further comprising:
means for sending the data at a lower data rate that does not cause the average throughput to exceed the threshold throughput at the receiving device, instead of entering the wait state, if signaling indicating that the detected average throughput exceeded the threshold throughput is received from the receiving device.

45. An apparatus for sending a data transmission to a receiving device in a wireless communication system, the apparatus comprising:
a data queue operative to receive data to send to the receiving device; and
a scheduler operative to enter a wait state if the data transmission to the receiving device has been stopped based on signaling sent by the receiving device when a detected average throughput at the receiving device exceeds a threshold throughput, wherein the threshold throughput is based on a maximum supported average data rate for the receiving device, and to send the data to the receiving device if the data transmission has not been stopped or upon exiting the wait state when the data transmission is resumed.

46. The apparatus of claim 45, wherein the scheduler is operative to enter the wait state in response to receiving a message covered with a null cover from the receiving device.

47. The apparatus of claim 45, wherein the scheduler is operative to enter the wait state in response to receiving a message requesting a transmission at zero data rate from the receiving device.

48. The apparatus of claim 45, wherein the scheduler is operative to exit the wait state in response to receiving signaling sent by the receiving device to resume the data transmission when the threshold throughput is not exceeded at the receiving device.

49. The apparatus of claim 45, wherein the scheduler is operative to send the data at a lower data rate that does not cause the average throughput to exceed the threshold throughput at the receiving device, instead of entering the wait state, if signaling indicating that the detected average throughput exceeded the threshold throughput is received from the receiving device.

50. An apparatus adapted for wireless communications, comprising
a processor configured to:
receive data to send to a receiving device;
enter a wait state if a data transmission to the receiving device has been stopped based on signaling sent by the receiving device when a detected average throughput at the receiving device exceeds a threshold throughput, wherein the threshold throughput is based on a maximum supported average data rate for the receiving device; and
send the data to the receiving device if the data transmission has not been stopped or upon exiting the wait state when the data transmission is resumed.

51. An apparatus for controlling a data transmission between a transmission source and a receiving device in a wireless communication system, the apparatus comprising:
means for receiving a current transmission at a current data rate for a current transmission interval;
means for detecting an average throughput for the data transmission and reflective of the current transmission;
means for comparing the detected average throughput against a threshold throughput;
means for signaling the transmission source to stop the data transmission if the detected average throughput exceeds the threshold throughput; and
means for averaging a value indicative of a throughput for the current transmission with values indicative of throughputs for one or more prior transmissions in one or more prior transmission intervals, wherein the averaging is achieved with a sliding window averaging.

52. The apparatus of claim 51, wherein the means for averaging is based in part on a design of a data buffer used to store samples for the data transmission.

53. The apparatus of claim 51, further comprising
means for resetting the average throughput to an initial value prior to reception of a first transmission for the data transmission.

54. The apparatus of claim 51, wherein the means for signaling includes
signaling the base station to resume the data transmission when the data transmission has been stopped and the threshold throughput is not exceeded.

55. An apparatus for receiving a data transmission from a transmission source in a wireless communication system, the apparatus comprising:
a detector operative
to receive a value indicative of a current data rate for a current transmission in a current transmission interval,
to detect an average throughput for the data transmission and reflective of the current transmission,
to compare the detected average throughput against a threshold throughput,
to provide a status signal indicative of a result of the comparison between the detected average throughput and the threshold throughput, and
to average a value indicative of a throughput for the current transmission with values indicative of throughputs for one or more prior transmissions in one or more prior transmission intervals, wherein the averaging is achieved with a sliding window averaging; and
a controller coupled to the detector and operative to receive the status signal and to signal the transmission source to stop the data transmission if the status signal indicates that the detected average throughput exceeds the threshold throughput.

56. An apparatus for controlling a data transmission between a transmission source and a receiving device in a wireless communication system, the apparatus comprising:
means for receiving a current transmission at a current data rate for a current transmission interval;
means for detecting an average throughput for the data transmission and reflective of the current transmission;
means for comparing the detected average throughput against a threshold throughput; and
means for signaling the transmission source to stop the data transmission if the detected average throughput exceeds the threshold throughput, wherein the signaling includes sending a message to the transmission source to request the data transmission be stopped, and wherein the message is covered by a null cover that indicates that data transmission is not requested by the receiving device.

57. The apparatus of claim 56, wherein the message requests a transmission at zero data rate.

58. The method of claim 56, wherein the message is sent for each transmission interval in which a transmission is not requested.

59. An apparatus for receiving a data transmission from a transmission source in a wireless communication system, the apparatus comprising:
a detector operative
to receive a value indicative of a current data rate for a current transmission in a current transmission interval,
to detect an average throughput for the data transmission and reflective of the current transmission, to compare the detected average throughput against a threshold throughput, and to provide a status signal indicative of a result of the comparison between the detected average throughput and the threshold throughput; and a controller coupled to the detector and operative to receive the status signal and to signal the transmission source to stop the data transmission if the status signal indicates that the detected average throughput exceeds the threshold throughput, wherein the signal includes a message that is covered by a null cover that indicates that data transmission is not requested.

60. In a wireless communication system, an apparatus for controlling a data transmission between a transmission source and a receiving device, the apparatus comprising:

means for receiving a current transmission at a current data rate for a current transmission interval;

means for detecting an average throughput for the data transmission and reflective of the current transmission;

means for comparing the detected average throughput against a threshold throughput; and means for signaling the transmission source to stop the data transmission if the detected average throughput exceeds the threshold throughput, wherein the signaling includes sending a message to the transmission source to request the data transmission be stopped, and wherein the message is covered by a null cover that indicates that data transmission is not requested by the receiving device.

61. The apparatus of claim 60, wherein the message requests a transmission at zero data rate.

62. The apparatus of claim 60, wherein the message is sent for each transmission interval in which a transmission is not requested.

63. In a wireless communication system, an apparatus for controlling a data transmission between a transmission source and a receiving device, the apparatus comprising:

means for receiving a current transmission at a current data rate for a current transmission interval;

means for detecting an average throughput for the data transmission and reflective of the current transmission;

means for comparing the detected average throughput against a threshold throughput;

means for signaling the transmission source to stop the data transmission if the detected average throughput exceeds the, threshold throughput; and means for averaging a value indicative of a throughput for the current transmission with values indicative of throughputs for one or more prior transmissions in one or more prior transmission intervals, wherein the averaging is achieved with a sliding window averaging.

64. The apparatus of claim 63, wherein said means for averaging includes means for selecting a particular averaging scheme based in part on a design of a data buffer used to store samples for the data transmission.

65. The apparatus of claim 63, further comprising means for resetting the average throughput to an initial value prior to reception of a first transmission for the data transmission.

66. The apparatus of claim 63, further comprising means for signaling the base station to resume the data transmission if the data transmission has been stopped and the threshold throughput is not exceeded.

* * * * *

UNITED STATES PATENT AND TRADEMARK OFFICE
CERTIFICATE OF CORRECTION

PATENT NO.        : 7,596,090 B2
APPLICATION NO. : 09/970586
DATED             : September 29, 2009
INVENTOR(S)       : Peter J. Black It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1475 days.

Signed and Sealed this

Twenty-eighth Day of September, 2010

David J. Kappos
*Director of the United States Patent and Trademark Office*